United States Patent
Zhang

(10) Patent No.: US 12,006,812 B2
(45) Date of Patent: Jun. 11, 2024

(54) METHOD AND SYSTEM FOR SUB-SEISMIC FRACTURE PREDICTION

(71) Applicant: SAUDI ARABIAN OIL COMPANY, Dhahran (SA)

(72) Inventor: Si-Hai Zhang, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 769 days.

(21) Appl. No.: 16/856,384

(22) Filed: Apr. 23, 2020

(65) Prior Publication Data

US 2021/0332691 A1   Oct. 28, 2021

(51) Int. Cl.
| | |
|---|---|
| *E21B 44/02* | (2006.01) |
| *E21B 43/26* | (2006.01) |
| *G01V 1/00* | (2006.01) |
| *G01V 1/28* | (2006.01) |

(52) U.S. Cl.
CPC .............. *E21B 44/02* (2013.01); *E21B 43/26* (2013.01); *G01V 1/003* (2013.01); *G01V 1/28* (2013.01); *E21B 2200/20* (2020.05); *G01V 2210/00* (2013.01); *G01V 2210/646* (2013.01)

(58) Field of Classification Search
CPC ...... E21B 44/02; E21B 43/26; E21B 2200/20; G01V 1/003; G01V 1/28; G01V 2210/00; G01V 2210/646
See application file for complete search history.

(56) References Cited

U.S. PATENT DOCUMENTS

| | | | |
|---|---|---|---|
| 4,780,857 A | 10/1988 | Lyle et al. | |
| 2010/0027377 A1 | 2/2010 | Zuercher | |
| 2010/0036614 A1 | 2/2010 | Zuercher | |
| 2012/0065889 A1* | 3/2012 | Wu | G01V 3/28 |
| | | | 702/11 |

(Continued)

FOREIGN PATENT DOCUMENTS

| | | |
|---|---|---|
| CN | 101907725 A | 12/2010 |
| CN | 103135131 B | 5/2015 |

(Continued)

OTHER PUBLICATIONS

Jin Lai et al.; "A review on the applications of image logs in structural analysis and sedimentary characterization"; Marine and Petroleum Geology 95 (2018) 139-166 (Year: 2018).*

(Continued)

*Primary Examiner* — Rehana Perveen
*Assistant Examiner* — Nupur Debnath
(74) *Attorney, Agent, or Firm* — Osha Bergman Watanabe & Burton LLP

(57) ABSTRACT

A method may include determining a portion of a microscale fracture using a well log acquired for a stratigraphic interval of interest. The method may further include obtaining seismic data for the stratigraphic interval of interest. The method may further include determining a seismic attribute that correlates the microscale fracture to a subset of the seismic data. The method may further include generating an attribute volume using the seismic attribute with a seismic volume for a region of interest. The method may further include generating, using the attribute volume, a fracture image of the microscale fracture throughout the region of interest.

17 Claims, 9 Drawing Sheets

(56) References Cited

U.S. PATENT DOCUMENTS

| | | | | |
|---|---|---|---|---|
| 2012/0090834 | A1* | 4/2012 | Imhof | G01V 1/307 |
| | | | | 702/14 |
| 2013/0345985 | A1* | 12/2013 | Priezzhev | G01V 1/32 |
| | | | | 702/14 |
| 2016/0209534 | A1 | 7/2016 | Behura | |
| 2017/0248719 | A1* | 8/2017 | Holman | G01V 11/00 |
| 2019/0235106 | A1 | 8/2019 | Dev et al. | |
| 2021/0003727 | A1* | 1/2021 | Zhu | G06F 30/23 |
| 2021/0003731 | A1* | 1/2021 | Zhu | G01V 1/282 |
| 2021/0332691 | A1* | 10/2021 | Zhang | G01V 1/28 |

FOREIGN PATENT DOCUMENTS

| | | | |
|---|---|---|---|
| CN | 104199091 B | 3/2017 | |
| CN | 108931814 A | 12/2018 | |
| CN | 109117580 A | 1/2019 | |
| CN | 110308487 A | 10/2019 | |
| GB | 2473607 A | 3/2011 | |
| RU | 2690089 C1 | 5/2019 | |
| WO | 2014070296 A1 | 5/2014 | |
| WO | 2015178931 A1 | 11/2015 | |
| WO | WO-2021048597 A1 * | 3/2021 | G01V 1/302 |

OTHER PUBLICATIONS

Chen et al.; "The application study on the multi-scales integrated prediction method to fractured reservoir description"; Applied Geophysics, vol. 13, No. 1 (Mar. 2016), p. 80-92, (Year: 2016).*

Dave Hale; "Methods to compute fault images, extract fault surfaces, and estimate fault throws from 3D seismic images"; Geophysics, vol. 78, No. 2 (Mar.-Apr. 2013); p. O33-O43 (Year: 2013).*

Geoffrey A. Dorn et al.; "Imaging faults in 3D seismic volumes"; SEG Las Vegas 2012 Annual Meeting (Year: 2012).*

Sanhasuk Koson et al.; "Seismic Attributes and Their Applications in Seismic Geomorphology"; Seismic attributes and seismic geomorphology. vol. 6, No. 1, 1-9 (Year: 2014).*

T. Chattopadhyay et al.; "Structural Interpretation of Dipmeter Log—A Case Study from Baramura Field of Tripura"; 6th International Conference & Exposition on Petroleum Geophysics "Kolkata 2006" (Year: 2006).*

A. Momeni et al. "Fracture and fluid flow paths analysis of an offshore carbonate reservoir using oil-based mud images and petrophysical logs"; Marine and Petroleum Geology 109 (2019) 349-3 (Year: 2019).*

International Search Report and Written Opinion issued in corresponding International Patent Application No. PCT/US2020/033898, dated Jan. 27, 2021 (18 pages).

Endres, H., et al, "Quantitative fracture prediction from seismic data", Petroleum Geoscience, Geological Society of London, vol. 14(4), P.A. 2008, pp. 369-377 (11 pages).

Far, Mehdi E. et al, "Seismic characterization of naturally fractured reservoirs using amplitude versus offset and azimuth analysis", Geophysical Prospecting, European Associate of Geoscientists & Engineers, 2013, pp. 427-447 (21 pages).

Gao, Dengliang, "Integrating 3D seismic curvature and curvature gradient attributes for fracture characterization: Methodologies and interpretational implications", Geophysics, vol. 78, No. 2, Mar.-Apr. 2013, pp. O21-O31 (16 pages).

Lisle, Richard J., "Detection of Zones of Abnormal Strains in Structures Using Gaussian Curvature Analysis", AAPG Bulletin, The American Associate of Petroleum Geologists, vol. 78, No. 12, Dec. 1994, pp. 1811-1819 (9 pages).

Maultzsch, Sonja et al, "Modelling frequency?dependent seismic anisotropy in fluid?saturated rock with aligned fractures: implication of fracture size estimation from anisotropic measurements", Geophysical Prospecting, European Association of Geoscientists & Engineers, vol. 51, 2003, pp. 381-392 (12 pages).

Prioul, Romain and Jeroen Jocker, "Fracture characterization at multiple scales using borehole images, sonic logs, and walkaround vertical seismic profile", AAPG Bulletin, The American Association of Petroleum Geologists, vol. 93, No. 11, Nov. 2009 pp. 1503-1516 (14 pages).

Chopra, Satinder and Kurt J. Marfurt, "Understanding the seismic disorder attribute and its applications", The Leading Edge, vol. 35, No. 8, Aug. 2016, pp. 695-702 (8 pages).

Randen, Trygve et al., "Automatic Dectection and Extraction of Faults from Three-Dimensional Seismic Data", SEG Technical Program Expanded Abstracts, vol. 20, No. 1, Jan. 1999, pp. 551-554 (5 pages).

Chopra, Satinder and Kurt J. Marfurt, Seismic Attributes for Prospect Identification and Reservoir Characterization, Tulsa, OK: Society of Exploration Geophysicists, 2007, pp. 52-61 (10 pages).

* cited by examiner

METHOD AND SYSTEM FOR SUB-SEISMIC FRACTURE PREDICTION

BACKGROUND

A seismic source may be used to generate pressure waves for mapping a subterranean formation. However, because of the seismic wavelength associated with an emitted pressure wave, large stratigraphic structures may be detected by a seismic survey while smaller stratigraphic structures in the formation may remain undetected.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method that includes determining, by a computer processor, a portion of a microscale fracture using a well log acquired for a stratigraphic interval of interest. The method further includes obtaining, by the computer processor, seismic data for the stratigraphic interval of interest. The method further includes determining, by the computer processor, a seismic attribute that correlates the microscale fracture to a subset of the seismic data. The method further includes generating, by the computer processor, an attribute volume using the seismic attribute with a seismic volume for a region of interest. The method further includes generating, by the computer processor and using the attribute volume, a fracture image of the microscale fracture throughout the region of interest.

In general, in one aspect, embodiments relate to a system that includes a logging system coupled to various logging tools and a drilling system coupled to the logging system. The system further includes a reservoir simulator that includes a computer processor. The reservoir simulator is coupled to the logging system and the drilling system. The reservoir simulator determines a portion of a microscale fracture in a subterranean formation using a well log acquired for a stratigraphic interval of interest. The reservoir simulator obtains seismic data for the stratigraphic interval of interest. The reservoir simulator determines a seismic attribute that correlates the microscale fracture to a subset of the seismic data. The reservoir simulator generates an attribute volume using the seismic attribute with a seismic volume for a region of interest. The reservoir simulator determines, using the attribute volume, a location of the microscale fracture throughout the region of interest. The reservoir simulator determining, using the location of the microscale fracture, a wellbore path through the subterranean formation.

In general, in one aspect, embodiments relate to non-transitory computer readable medium storing instructions executable by a computer processor. The instructions determine a portion of a microscale fracture in a subterranean formation using a well log acquired for a stratigraphic interval of interest. The instructions obtain seismic data for the stratigraphic interval of interest. The instructions determine a seismic attribute that correlates the microscale fracture to a subset of the seismic data. The instructions generate an attribute volume using the seismic attribute with a seismic volume for a region of interest. The instructions determine, using the attribute volume, a location of the microscale fracture throughout the region of interest.

Other aspects of the disclosure will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include systems and methods for using various seismic attributes to identify sub-seismic fractures, such as microscale fractures, within a formation. Due to the degree of precision in acquired seismic data, micro scale fractures may be undetectable through simple seismic inversion techniques. However, by independently determining a microscale fracture using well log data (e.g., data from a dipmeter logging tool), a particular seismic attribute may be tailored or calibrated to identify microscale fractures beyond a wellbore and within a seismic volume. In some embodiments, this tailored seismic attribute is a chaos attribute. Using a chaos attribute, for example, a chaos volume may be generated and verified using known microscale fractures within the formation. This validated chaos volume may subsequently be used to map and analyze microscale fractures beyond the depth of investigation of existing well logs. Using this knowledge of microscale fractures, in some embodiments, well locations and/or wellbore paths may be determined that utilize such microscale fractures to access hydrocarbon-bearing formations.

Figure 1:
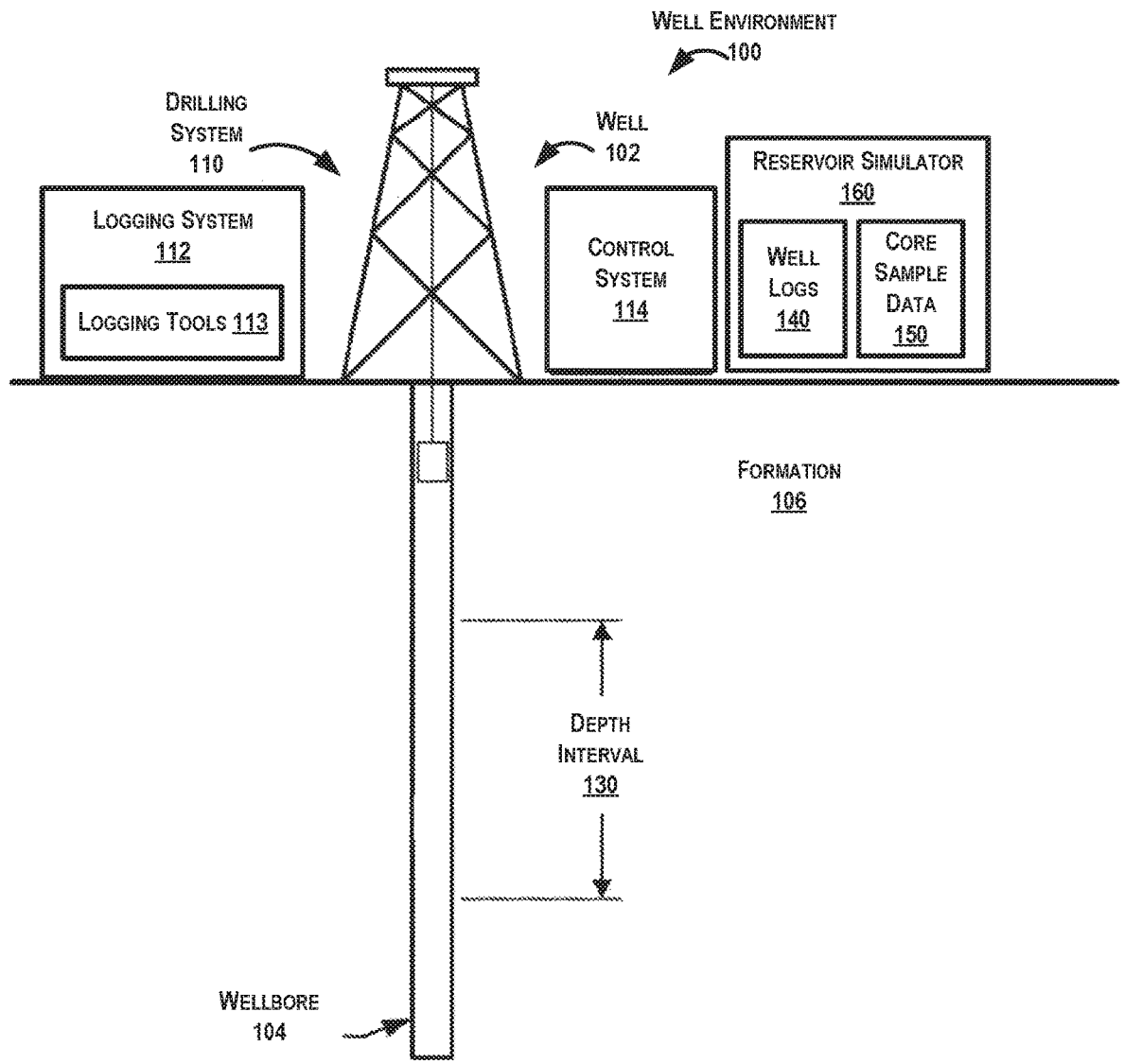
FIGS. 1, 2, and 3 show systems in accordance with one or more embodiments.

Turning to FIG. 1, FIG. 1 shows a schematic diagram in accordance with one or more embodiments. As shown in FIG. 1, FIG. 1 illustrates a well environment (100) that may include a well (102) having a wellbore (104) extending into a formation (106). The wellbore (104) may include a bored hole that extends from the surface into a target zone of the formation (106), such as a reservoir. The formation (106) may include various formation characteristics of interest, such as formation porosity, formation permeability, resistivity, water saturation, free water level (FWL), and the like. Porosity may indicate how much space exists in a particular rock within an area of interest in the formation (106), where oil, gas, and/or water may be trapped. Permeability may indicate the ability of liquids and gases to flow through the rock within the area of interest. Resistivity may indicate how strongly rock and/or fluid within the formation (106) opposes the flow of electrical current. For example, resistivity may be indicative of the porosity of the formation (106) and the presence of hydrocarbons. More specifically, resistivity may be relatively low for a formation that has high porosity and a large amount of water, and resistivity may be relatively high for a formation that has low porosity or includes a large amount of hydrocarbons. Water saturation may indicate the fraction of water in a given pore space.

Keeping with FIG. 1, the well environment (100) may include a drilling system (110), a logging system (112), a control system (114), and a reservoir simulator (160). The drilling system (110) may include a drill string, drill bit, a mud circulation system and/or the like for use in boring the wellbore (104) into the formation (106). The control system (114) may include hardware and/or software for managing drilling operations and/or maintenance operations. For example, the control system (114) may include one or more programmable logic controllers (PLCs) that include hardware and/or software with functionality to control one or more processes performed by the drilling system (110). Specifically, a programmable logic controller may control valve states, fluid levels, pipe pressures, warning alarms, and/or pressure releases throughout a drilling rig. In particular, a programmable logic controller may be a ruggedized computer system with functionality to withstand vibrations, extreme temperatures, wet conditions, and/or dusty conditions, for example, around a drilling rig. Without loss of generality, the term "control system" may refer to a drilling operation control system that is used to operate and control the equipment, a drilling data acquisition and monitoring system that is used to acquire drilling process and equipment data and to monitor the operation of the drilling process, or a drilling interpretation software system that is used to analyze and understand drilling events and progress.

Turning to the reservoir simulator (160), a reservoir simulator (160) may include hardware and/or software with functionality for storing and analyzing well logs (140), core sample data (150), seismic data, and/or other types of data to generate and/or update one or more geological models. While the reservoir simulator (160) is shown at a well site, in some embodiments, the reservoir simulator (160) may be remote from a well site. In some embodiments, the reservoir simulator (160) is implemented as part of a software platform for the control system (114). The software platform may obtain data acquired by the drilling system (110) and logging system (112) as inputs, which may include multiple data types from multiple sources. The software platform may aggregate the data from these systems (110, 112) in real time for rapid analysis. In some embodiments, the control system (114), the logging system (112), and/or the reservoir simulator (160) may include a computer system that is similar to the computer system (900) described below with regard to FIG. 9 and the accompanying description.

The logging system (112) may include one or more logging tools (113), such as a nuclear magnetic resonance (NMR) logging tool and/or a resistivity logging tool, for use in generating well logs (140) of the formation (106). For example, a logging tool may be lowered into the wellbore (104) to acquire measurements as the tool traverses a depth interval (130) (e.g., targeted reservoir section) of the wellbore (104). The plot of the logging measurements versus depth may be referred to as a "log" or "well log". Well logs (104) may provide depth measurements of the well (102) that describe such reservoir characteristics as formation porosity, formation permeability, resistivity, water saturation, and the like. The resulting logging measurements may be stored and/or processed, for example, by the control system (114), to generate corresponding well logs (140) for the well (102). A well log may include, for example, a plot of a logging response time versus true vertical depth (TVD) across the depth interval (130) of the wellbore (104).

Reservoir characteristics may be determined using a variety of different techniques. For example, certain reservoir characteristics can be determined via coring (e.g., physical extraction of rock samples) to produce core samples and/or logging operations (e.g., wireline logging, logging-while-drilling (LWD) and measurement-while-drilling (MWD)). Coring operations may include physically extracting a rock sample from a region of interest within the wellbore (104) for detailed laboratory analysis. For example, when drilling an oil or gas well, a coring bit may cut plugs (or "cores" or "core samples") from the formation (106) and bring the plugs to the surface, and these core samples may be analyzed at the surface (e.g., in a lab) to determine various characteristics of the formation (106) at the location where the sample was obtained.

Turning to various coring technique examples, conventional coring may include collecting a cylindrical sample of rock from the wellbore (104) using a core bit, a core barrel, and a core catcher. The core bit may have a hole in its center that allows the core bit to drill around a central cylinder of rock. Subsequently, the resulting core sample may be acquired by the core bit and disposed inside the core barrel. More specifically, the core barrel may include a special storage chamber within a coring tool for holding the core sample. Furthermore, the core catcher may provide a grip to the bottom of a core and, as tension is applied to the drill string, the rock under the core breaks away from the undrilled formation below coring tool. Thus, the core catcher may retain the core sample to avoid the core sample falling through the bottom of the drill string.

With respect to special coring techniques, coring may also be performed using a wireline-conveyed percussion sidewall coring or mechanically-drilled sidewall-coring techniques. For example, special coring techniques may be used where conventional coring techniques are unavailable or a special coring sample is required for a special analysis. In another example, a rotary-drilled sidewall coring technique may acquire undamaged core samples suitable for special core testing. Examples of special coring techniques may include using heavy duty conventional core barrels, disposable inner core barrels, core barrel lines, and/or a full-closure coring system. In particular, full-closure coring systems may be used for coring in an unconsolidated formation. More specifically, a full-closure coring system may use disposable inner barrels and/or inner barrel liners and a special core-catching system to retrieve soft cores during sample acquisition. Another special coring technique includes sponge coring. For example, a sponge coring tool may include a sponge sleeve or liner modification to an inner core barrel that is used in conventional coring. This sponge sleeve may be made of a tough porous polyurethane sponge, such that the sponge absorbs oil that bleeds from the core sample. The oil-wet sponge may hold oil tightly, while allowing water and gas to move through the sponge and out vent holes drilled in the aluminum liner.

Turning to examples of logging techniques, multiple types of logging techniques are available for determining various reservoir characteristics. For example, nuclear magnetic resonance (NMR) logging measures the induced magnetic moment of hydrogen nuclei (i.e., protons) contained within the fluid-filled pore space of porous media (e.g., reservoir rocks). Thus, NMR logs may measure the magnetic response of fluids present in the pore spaces of the reservoir rocks. In so doing, NMR logs may measure both porosity and permeability, as well as the types of fluids present in the pore spaces. For determining permeability, another type of logging may be used that is called spontaneous potential (SP) logging. SP logging may determine the permeabilities of rocks in the formation (106) by measuring the amount of electrical current generated between drilling fluid produced by the drilling system (110) and formation water that is held in pore spaces of the reservoir rock. Porous sandstones with high permeabilities may generate more electricity than impermeable shales. Thus, SP logs may be used to identify sandstones from shales.

To determine porosity in the formation (106), various types of logging techniques may be used. For example, the logging system (112) may measure the speed that acoustic waves travel through rocks in the formation (106). This type of logging may generate borehole compensated (BHC) logs, which are also called sonic logs. In general, sound waves may travel faster through high-density shales than through lower-density sandstones. Likewise, density logging may also determine porosity measurements by directly measuring the density of the rocks in the formation (106). Furthermore, neutron logging may determine porosity measurements by assuming that the reservoir pore spaces within the formation (106) are filled with either water or oil and then measuring the amount of hydrogen atoms (i.e., neutrons) in the pores.

Keeping with the various types of logging techniques, resistivity logging may measure the electrical resistivity of rock or sediment in and around the wellbore (104). In particular, resistivity measurements may determine what types of fluids are present in the formation (106) by measuring how effective these rocks are at conducting electricity. Because fresh water and oil are poor conductors of electricity, they have high resistivities. As such, resistivity measurements obtained via such logging can be used to determine corresponding reservoir water saturation (Sw).

Another type of logging technique includes dielectric logging. For example, dielectric permittivity may be defined as a physical quantity that describes the propagation of an electromagnetic field through a dielectric medium. As such, dielectric permittivity may describe a physical medium's ability to polarize in response to an electromagnetic field, and thus reduce the total electric field inside the physical medium. In a portion of reservoir rock, water may have a large dielectric permittivity that is higher than any associated rock or hydrocarbon fluids within the portion. In particular, water permittivity may depend on a frequency of an electromagnetic wave, water pressure, water temperature, and salinity of the reservoir rock mixture.

Keeping with dielectric logging, a dielectric logging tool may determine a dielectric constant (i.e., relative-permittivity) measurement. For example, the dielectric logging tool may include an antenna that detects relative dielectric constants between different fluids at a fluid interface. As such, a dielectric logging tool may generate a dielectric log of the high-frequency dielectric properties of a formation. In particular, a dielectric log may include two curves, where one curve may describe the relative dielectric permittivity of the analyzed rock and the other curve may describe the resistivity of the analyzed rock. Relative dielectric permittivity may be used to distinguish hydrocarbons from water of differing salinities. However, the effect of salinity may be more important than the salinity effect with a high-frequency dielectric log (also called an "electromagnetic propagation log").

Turning to geosteering, geosteering may be used to determine a wellbore path relative to a boundary between different subsurface layers (e.g., overlying, underlying, and lateral layers of the formation (106)) during drilling operations. In particular, measuring rock properties during drilling may provide the drilling system (110) with the ability to steer a drill bit in the direction of desired hydrocarbon concentrations. As such, a geosteering system may use various sensors located inside or adjacent to a drilling string to determine different rock formations within a wellbore's path. In some geosteering systems, drilling tools may use resistivity or acoustic measurements to guide the drill bit during horizontal or lateral drilling. When resistivity measurements are employed, the upper and lower boundaries of a subsurface layer are computed from geological models using inversion techniques. In some embodiments, an attribute map for an interval of interest is used to determine a wellbore path or geosteering operations through a formation.

Figure 2:
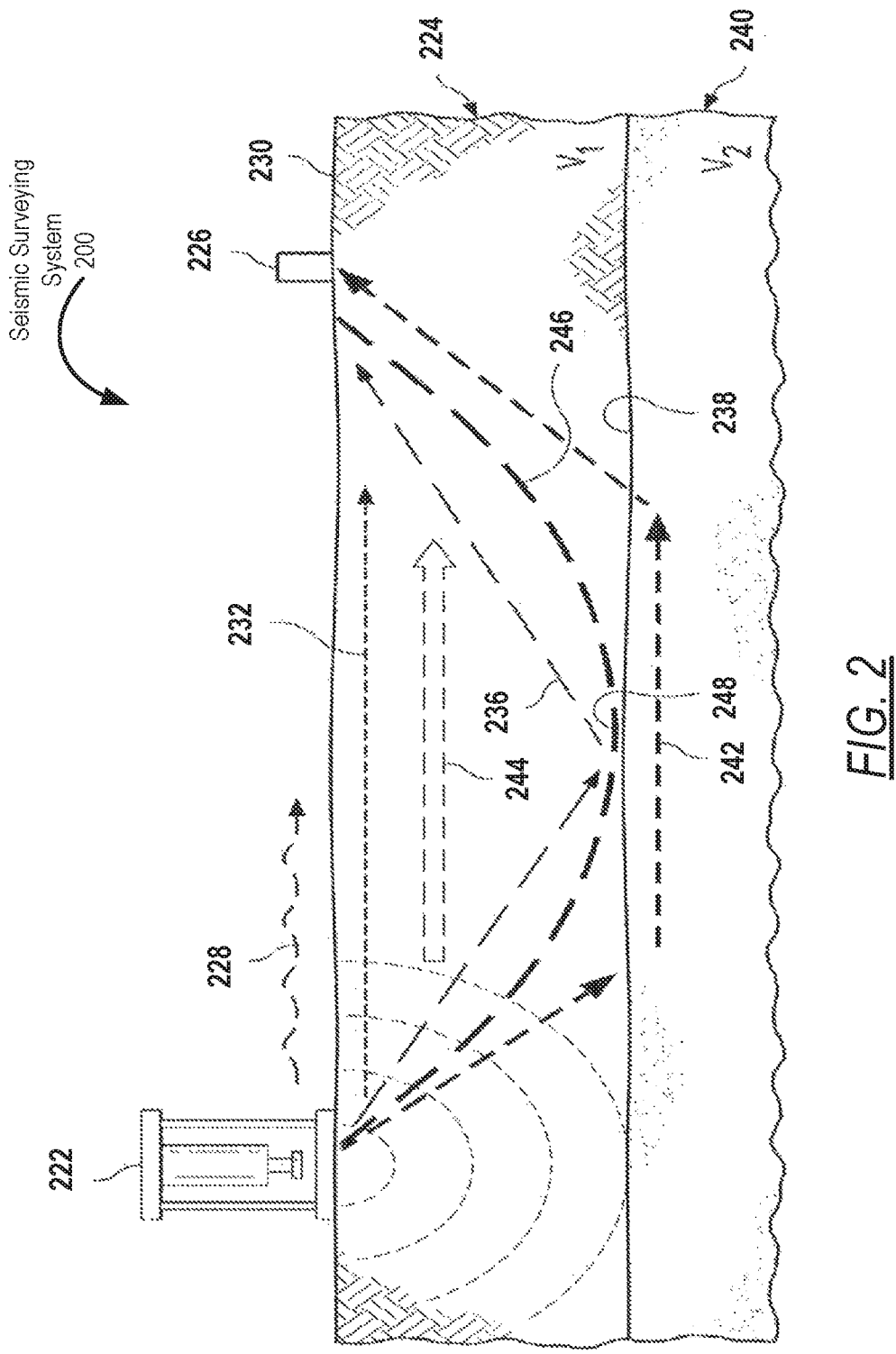

Turning to FIG. 2, FIG. 2 shows a schematic diagram in accordance with one or more embodiments. As shown in FIG. 2, FIG. 2 illustrates a seismic surveying system (200) and the resultant travel paths of pressure waves (also called seismic waves). The seismic surveying system (200) includes a seismic source (222) that includes functionality for generating pressure waves, such as a reflected wave (236), diving wave A (242), or diving wave B (246) through a subsurface layer (224). Pressure waves generated by the seismic source (222) may travel along several travel paths through a subsurface layer (224) at a particle velocity $V_1$ for detection at a number of seismic receivers (226) along the line of profile. Likewise, particle velocity may refer to multiple velocities types, such as the two types of particle motions resulting from a seismic wave, i.e., velocity of the primary wave and a different velocity of the secondary wave through a particular medium. The seismic source (222) may be a seismic vibrator, such as one that uses a vibroseis technique, an airgun in the case of offshore seismic surveying, or explosives. The seismic receivers (226) may include geophones, hydrophones, accelerometers, and other sensing devices. Likewise, seismic receivers (226) may include single component sensors and/or multi-component sensors that measure pressure waves in multiple axes.

As shown in FIG. 2, the seismic source (222) generates an air wave (228) formed by a portion of the emitted seismic energy, which travels above the earth's surface (230) to the seismic receivers (226). The seismic source (222) also emits surface waves (232), which travel along the earth's surface (230). The speed of the surface waves (232), also called Rayleigh waves or ground roll, may correspond to a particle velocity typically slower than the velocity of a secondary wave. While the seismic survey shown in FIG. 2 is a two-dimensional survey along a seismic line of profile along a longitudinal direction, other embodiments are contemplated, such as three-dimensional surveys.

As shown in FIG. 2, subsurface layer (224) has a particle velocity $V_1$, while subsurface layer (240) has a particle velocity $V_2$. A particle velocity may refer to the speed that a pressure wave travels through a medium, e.g., diving wave B (246) that makes a curvilinear ray path (248) through subsurface layer (224). Particle velocity may depend on a particular medium's density and elasticity as well as various wave properties, such as the frequency of an emitted pressure wave. Where particle velocity differs between two subsurface layers, this seismic impedance mismatch may result in a seismic reflection of a pressure wave. For example, FIG. 2 shows a pressure wave transmitted downwardly from the seismic source (222) to a subsurface interface (238), which becomes a reflected wave (236) transmitted upwardly in response to the seismic reflection. The seismic source (222) may also generate a direct wave (244) that travels directly from the seismic source (222) at the particle velocity V1 through the subsurface layer (224) to the seismic receivers (226).

Turning to refracted pressure waves, the seismic source (222) may also generate a refracted wave (i.e., diving wave A (242)) that is refracted at the subsurface interface (238) and travels along the subsurface interface (238) for some distance as shown in FIG. 2 until traveling upwardly to the seismic receivers (226). As such, refracted pressure waves may include diving waves (e.g., diving wave A (242), diving wave B (246)) that may be analyzed to map the subsurface layers (224, 240). For example, a diving wave may be a type of refracted wave that is continuously refracted throughout an earth's subsurface. Thus, a diving wave may be generated where particle velocities are gradually increasing with depth at a gradient. Likewise, the apex of a diving wave may be offset from a common midpoint (CMP) in contrast to reflected seismic energy. Though, for analysis purposes, an apex of a diving wave may be regarded as a common midpoint for the refracted energy. As such, the apex may serve as the basis for organizing and sorting a seismic survey dataset.

Furthermore, in analyzing seismic data acquired using the seismic surveying system (200), seismic wave propagation may be approximated using rays. For example, reflected waves (e.g., reflected wave (236)) and diving waves (e.g., diving waves (242, 246)) may be scattered at the subsurface interface (238). In FIG. 2, for example, the diving wave B (246) may exhibit a ray path of a wide angle that resembles a reflected wave in order to map the subsurface. Using diving waves, for example, a velocity model for an underlying subsurface may be generated that describes the particle velocity of different subsurface layers.

Figure 3:
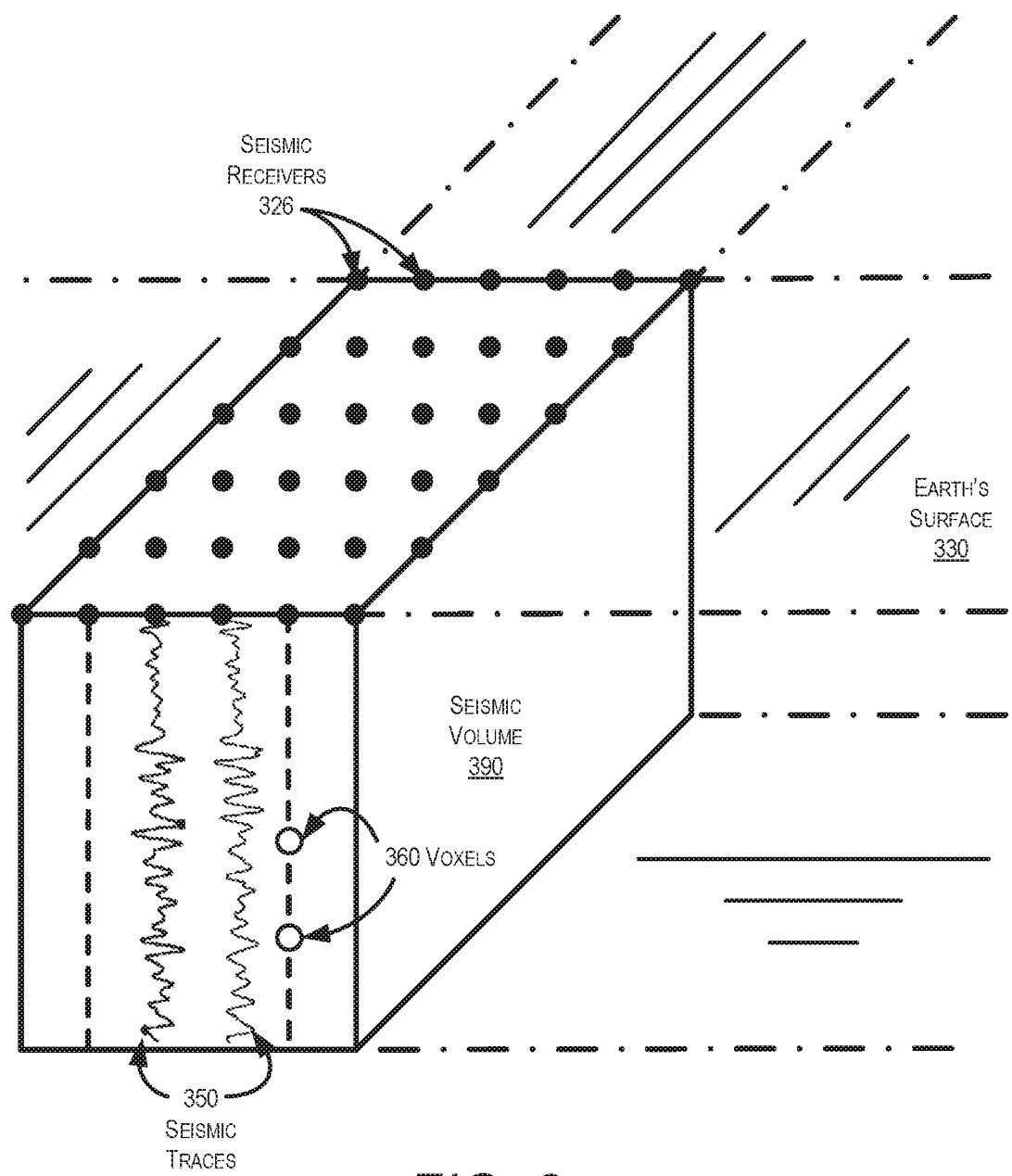

Turning to FIG. 3, FIG. 3 illustrates a system in accordance with one or more embodiments. As shown in FIG. 3, a seismic volume (390) is illustrated that includes various seismic traces (e.g., seismic traces (350)) acquired by various seismic receivers (e.g., seismic receivers (326)) disposed on the earth's surface (330). More specifically, a seismic volume (390) may be a three-dimensional cubic data set of seismic traces. Individual cubic cells within the seismic volume (390) may be referred to as voxels or volumetric pixels (e.g., voxels (360)). In particular, different portions of a seismic trace may correspond to various depth points within a volume of earth. To generate the seismic volume (390), a three-dimensional array of seismic receivers (326) are disposed along the earth's surface (330) and acquire seismic data in response to various pressure waves emitted by seismic sources. Within the voxels (360), statistics may be calculated on first break data that is assigned to a particular voxel to determine multimodal distributions of wave travel times and derive travel time estimates (e.g., according to mean, median, mode, standard deviation, kurtosis, and other suitable statistical accuracy analytical measures) related to azimuthal sectors. First break data may describe the onset arrival of refracted waves or diving waves at the seismic receivers (326) as produced by a particular seismic source signal generation.

Seismic data may refer to time domain data acquired from a seismic survey (e.g., acquired seismic data may result in the seismic volume (390)). However, seismic data may also refer to data acquired over different periods of time, such as in cases where seismic surveys are repeated to obtain time-lapse data. Seismic data may also refer to various seismic attributes derived in response to processing acquired seismic data. Furthermore, in some embodiments, seismic data may also refer to depth data. For example, seismic data may be processed, e.g., using a seismic inversion operation, to generate a velocity model of a subterranean formation, or a migrated seismic image of a rock formation within the earth's surface.

While seismic traces with zero offset are generally illustrated in FIG. 3, seismic traces may be stacked, migrated and/or used to generate an attribute volume derived from the underlying seismic traces. For example, an attribute volume may be a dataset where the seismic volume undergoes one or more processing techniques, such as amplitude-versus-offset (AVO) processing. In AVO processing, seismic data may be classified based on reflected amplitude variations due to the presence of hydrocarbon accumulations in a subsurface formation. With an AVO approach, seismic attributes of a subsurface interface may be determined from the dependence of the detected amplitude of seismic reflections on the angle of incidence of the seismic energy. This AVO processing may determine both a normal incidence coefficient of a seismic reflection, and/or a gradient component of the seismic reflection. Likewise, seismic data may be processed according to a pressure wave's apex. In particular, the apex may serve as a data gather point to sort first break picks for seismic data records or traces into offset bins based on the survey dimensional data (e.g., the x-y locations of the seismic receivers (326) on the earth surface (330)). The bins may include different numbers of traces and/or different coordinate dimensions.

While FIGS. 1, 2, and 3 show various configurations of components, other configurations may be used without departing from the scope of the disclosure. For example, various components in FIGS. 1, 2, and 3 may be combined to create a single component. As another example, the functionality performed by a single component may be performed by two or more components.

Figure 4:
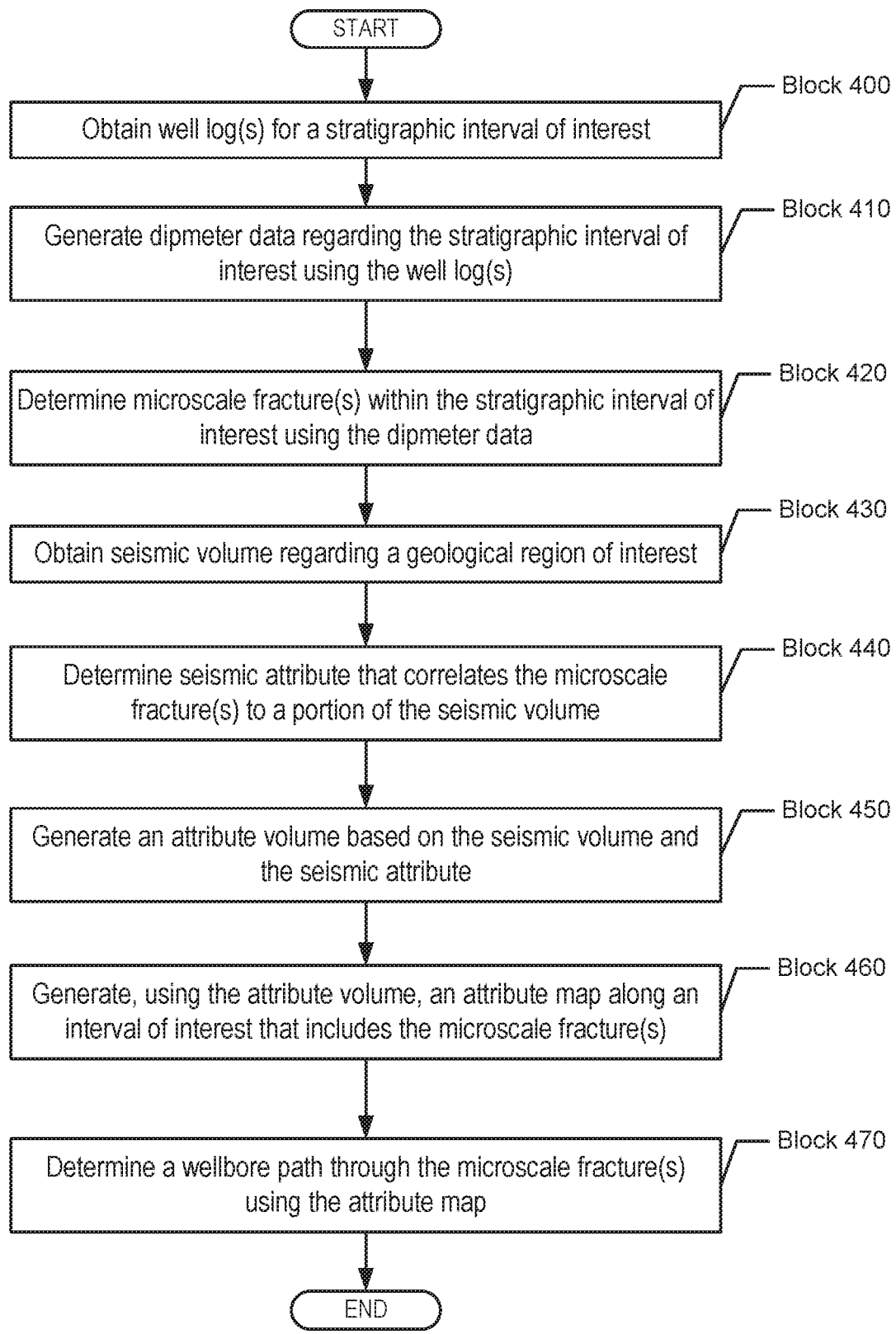
FIG. 4 shows a flowchart in accordance with one or more embodiments.

Turning to FIG. 4, FIG. 4 shows a flowchart in accordance with one or more embodiments. Specifically, FIG. 4 describes a method for generating an attribute map that includes one or more fractures and/or determining a wellbore path using an attribute map. One or more blocks in FIG. 4 may be performed by one or more components (e.g., reservoir simulator (160)) as described in FIGS. 1, 2, and/or 3. While the various blocks in FIG. 4 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 400, one or more well logs are obtained for a stratigraphic interval of interest in accordance with one or more embodiments. In some embodiments, for example, the well logs may include one or more dipmeter plots that are acquired using a dipmeter logging tool. In particular, a dipmeter logging tool may measure a dip angle and a direction of a planar surface, e.g., using the elevation and geographical position of the dipmeter logging tool at three different points. Dipmeter logging tools may include three or more identical sensors that scan different sides of a wellbore wall. As such, a bedding plane crossing the wellbore at a particular angle may generate an anomaly at one of the dipmeter logging tool's sensors. Changes to radial and azimuthal positions of sensors may thus produce dipmeter measurements relative to the dipmeter logging tool. In some embodiments, the stratigraphic interval of interest may be similar to the depth interval (130) described above in FIG. 1.

In Block 410, dipmeter data regarding a stratigraphic interval of interest is generated using one or more well logs in accordance with one or more embodiments. Using well logs, for example, dipmeter data may be obtained that describes a dip field within the stratigraphic interval of interest. For example, a dip value may be a measurement of the angle of formations, where the dip value may calculate curvature and azimuth regarding a stratigraphic structure in a formation.

In some embodiments, for example, a normal angle of a point on a subsurface reflector may be found by calculating a gradient value at the point. Thus, the gradient value may be determined using one partial derivative for each dimension. However, large variations may occur in different gradient estimates. As such, principal component analysis may be used to determine a local dip value of a stratigraphic structure, e.g., a fracture within a formation. In some embodiments, for example, dipmeter data describes a dominating orientation of the stratigraphic structure by aggregating various gradients into an orientation matrix. The orientation matrix may be a covariance matrix that is decomposed into respective eigenvectors and eigenvalues. The eigenvectors may correspond to the three principal directions of the gradients involved in the orientation matrix with the eigenvalues indicating the magnitudes of the eigenvectors. As such, the dominating orientation of a stratigraphic structure may be the eigenvector with the largest eigenvalue. Thus, the dominating orientation vector may correspond to a local dip value.

In some embodiments, image log data acquired from well logs are interpreted to generate dipmeter data. In particular, image log data may include a graphical representation of raw dip measurements. For example, image log interpretation may be performed by comparing raw dip measurements to various lithologies, e.g., dipmeter plots of fracture developed wells and non-fracture developed wells. In particular, image log data in a stratigraphic interval of interest may be inputted to a reservoir simulator and interpreted accordingly. The image log data may be processed to generate dipmeter plots. More specifically, a dipmeter plot may illustrate a stratigraphic structure with a low plane angle (e.g., less than 10° in general) in the region of interest. This low plane angle may correspond to a bedding layer within a subsurface. Likewise, another dipmeter plot may illustrate a large dip angle range (e.g., 0 to 30°) that may correspond to a fracture. Thus, in some embodiments, different angle thresholds are used to determine different types of stratigraphic structures within the subsurface. Dipmeter data may be calibrated using thin sections of a stratigraphic interval of interest.

In Block 420, one or more microscale fractures are determined within a stratigraphic interval of interest using dipmeter data in accordance with one or more embodiments. More specifically, natural fractures within a rock formation may be categorized as a macroscale fracture, a mesoscale fracture, or a microscale fracture according to the fracture size and seismic wavelength. A microscale fracture, also called sub-seismic fracture, may be a stratigraphic structure that is smaller than a seismic wavelength of an emitted pressure wave. Likewise, microscale fractures may be smaller than cross-bedding or ripple lamination. Thus, a micro scale fracture may be detectable by core samples and dipmeter logging tools, while being undetectable within seismic data.

In some embodiments, microscale fractures are identifying using other detection methods besides dipmeter data, such as using core sample data or other types of well logs besides dipmeter logs. In some embodiments, for example, a natural fracture may be identified within a wellbore from stress-induced sonic anisotropy using a combination of image logs and sonic logs. In another embodiment, microscale fractures are identified using amplitude variations with azimuths (AVAZ).

Figure 5:
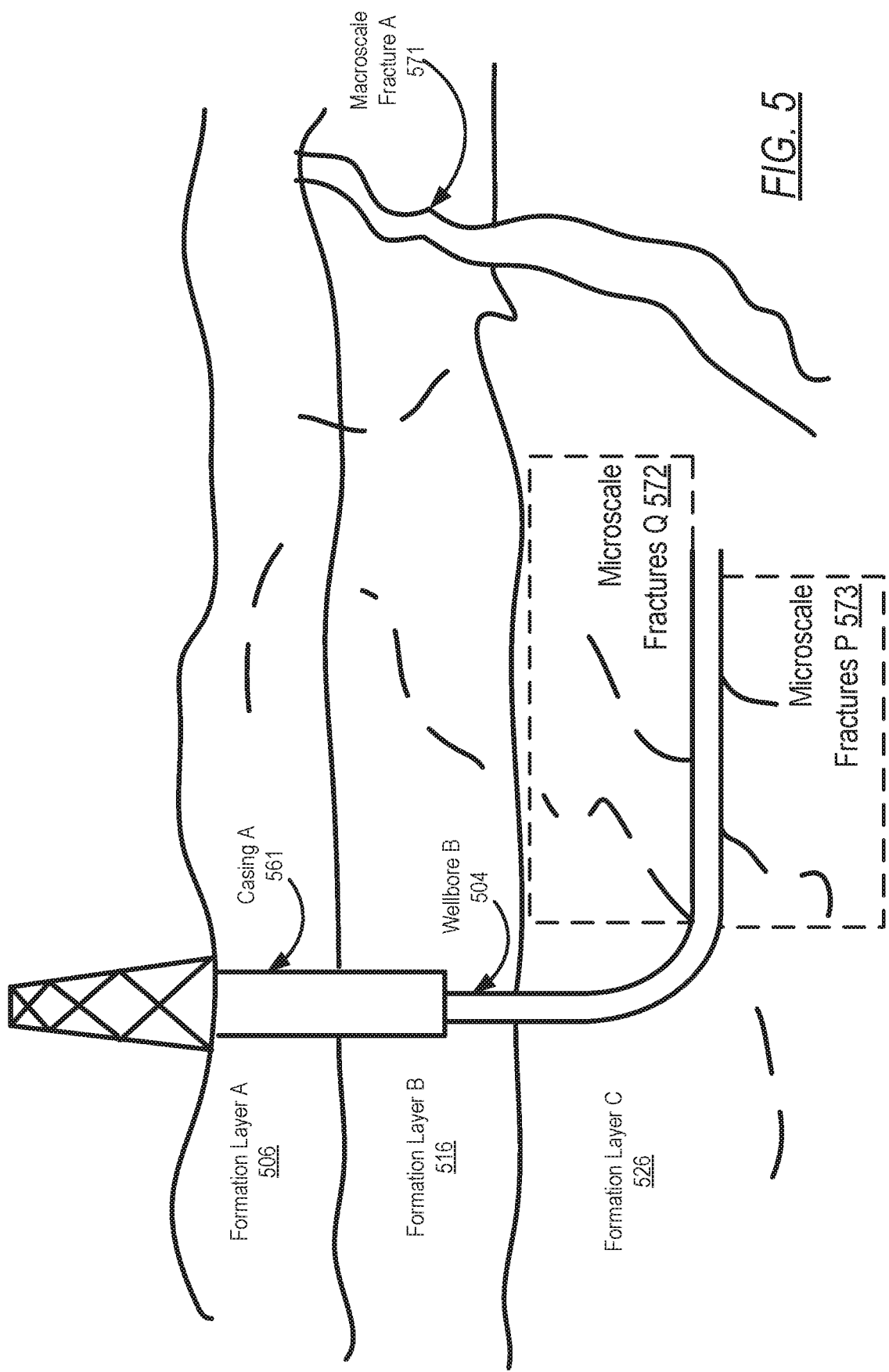
FIGS. 5, 6, 7, and 8 show examples in accordance with one or more embodiments.

Turning to FIG. 5, FIG. 5 provides an example of detecting fractures proximate to a wellbore. The following example is for explanatory purposes only and not intended to limit the scope of the disclosed technology. In FIG. 5, a wellbore B (504) is shown drilled through several formation layers (i.e., formation layer A (506), formation layer B (516), formation layer C (526)). A casing A (561) is installed in a portion of wellbore B (504), and the wellbore B (504) passes proximate to several microscale fractures (i.e., microscale fractures Q (572), microscale fractures P (573)). As shown, the microscale fractures (572, 573) are smaller than macroscale fracture A (571). Where the macroscale fracture A (571) may be detected by a seismic surveying system (not shown), the microscale fractures (572, 573) may remain undetected by the seismic surveying system. As such, a logging tool, such as a dipmeter logging tool, in wellbore B (504) may provide raw dipmeter measurements that identify portions of the microscale fractures (572, 573).

Returning to FIG. 4, in Block 430, a seismic volume is obtained regarding a geological region of interest in accordance with one or more embodiments. For example, a reservoir simulator may obtain a 3D seismic volume for a geological region of interest. Furthermore, the geological region of interest may a much larger area of interest than the stratigraphic interval of interest described in Blocks 400-420. Accordingly, the geological region of interest may be surveyed by a seismic surveying system similar to the seismic surveying system (200) described above in FIG. 2 and the accompanying description. Likewise, the seismic volume may be similar to seismic volume (390) described above in FIG. 3 and the accompanying description. Thus, the seismic volume may include sets of seismic traces organized into lines where each seismic trace has an x-coordinate and a y-coordinate, e.g., corresponding to the location of seismic receivers. Likewise, different data points within a seismic trace may correspond to a certain seismic travel time or depth (i.e., t value or z value).

Figure 7:
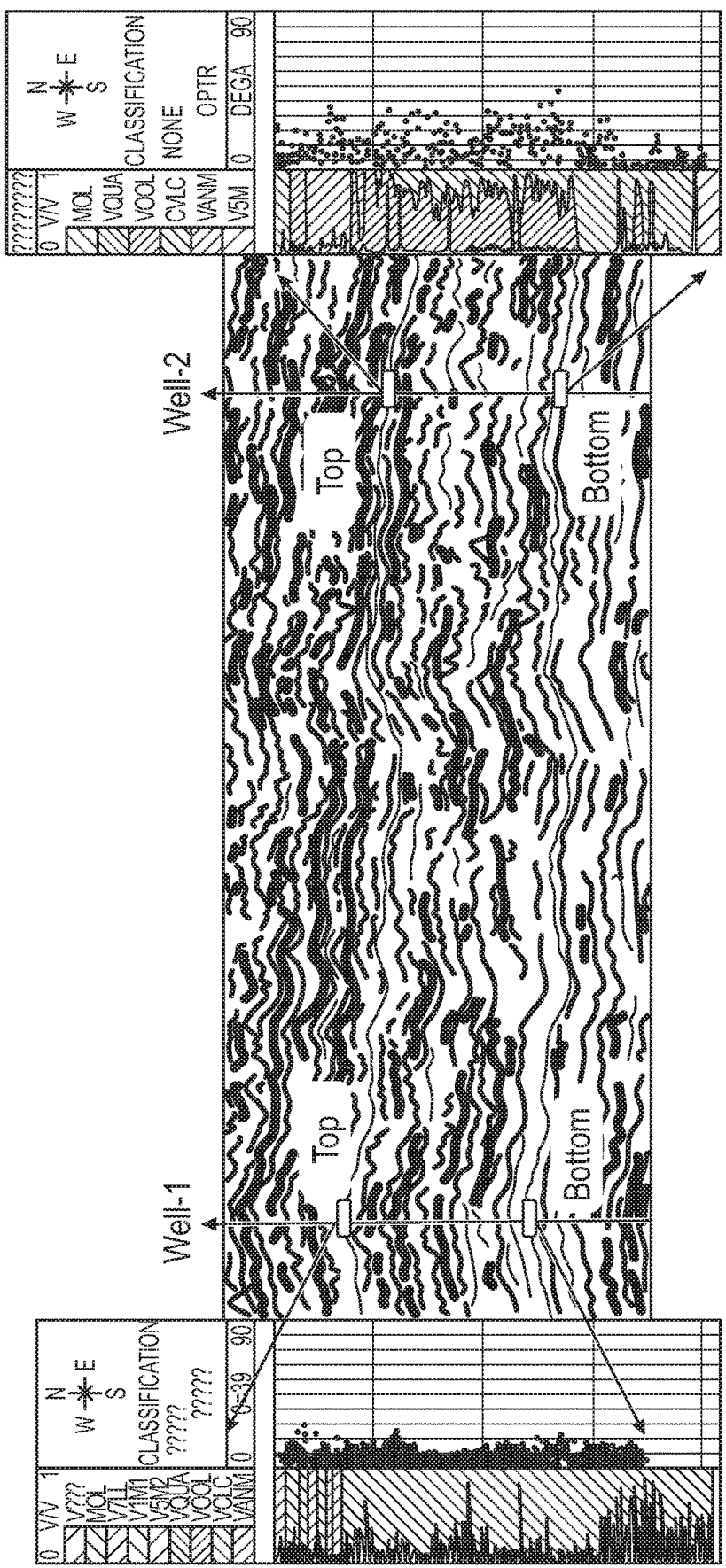

In Block 440, a seismic attribute is determined that correlates one or more microscale fractures to a portion of seismic volume in accordance with one or more embodiments. For example, interpreted dipmeter plots may be matched to seismic data values within a seismic volume. Portions of two wells representing a microscale fractured areas and non-fractured areas may be selected for identifying different subsets within the seismic data. In particular, a microscale fracture may produce a specific type of seismic reflection or signature that provides identification with a specific type of seismic attribute. For example, the dipmeter plots for a bedding layer may correspond to a series of continuous seismic reflections across a stratigraphic interval. In contrast, dipmeter plots with a large range of dip angles) (0-30° may represent microscale fractures with chaotic seismic reflections, e.g., as incoherent seismic energy. Thus, a seismic attribute may be determined that associates sub-seismic fracture with chaotic seismic reflections in the seismic volume. FIG. 7 provides an example of this correlation procedure in accordance with one or more embodiments. In FIG. 7, a fracture is interpreted by image log, and the fracture is subsequently correlated to seismic data within a stratigraphic interval of interest. As shown, a well-1 includes various dipmeter plots that show plane angle less than 10° and are interpreted as bedding that correspond with very continuous seismic reflections across the stratigraphic intervals of interest. In contrast, well-2 shows a range of dip angles between 0 and 30° and thus chaotic seismic reflections.

In some embodiments, a chaos attribute is determined based on a seismic data correlation. For example, a chaos attribute may illustrate the seismic chaotic texture for quantifying chaoticness of seismic reflections. In some embodiments, a chaos attribute is based on an eigenanalysis of a 3×3 gradient structure tensor. As such, where a first eigenvalue is large, the corresponding first eigenvector may define the normal angle to a local plane of constant amplitude waveforms. If the three eigenvalues in the eigenanalysis are equal, the seismic data may be completely chaotic. In some embodiments, the ratios of the eigenvalues are used to distinguish between various subsurface reflectors, e.g., a fracture in contrast to a continuous layer, such as a bedding. Likewise, a chaotic signal pattern identified within seismic data may provide a measure of the lack of organization in dip and/or azimuth estimation processes. Accordingly, a chaos attribute may be used by a reservoir simulator to illuminate faults, microscale fractures, and/or other discontinuities within a formation for seismic classification. In some embodiments, a modified chaos attribute is used to determine a portion of a microscale fracture.

In some embodiments, other seismic attributes may be employed in place of or in addition to a chaos attribute for correlating subsets of seismic data with discontinuities within a formation. For example, a curvature attribute may be used to depicts a geometry of a seismic reflectors. Another seismic attribute may be seismic coherency for characterizing the fractal behavior of stratigraphic structures to predict sub-seismic fractures.

In Block 450, an attribute volume is generated based on a seismic volume and a seismic attribute in accordance with one or more embodiments. For example, an attribute volume may be generated based on the seismic attribute determined in Block 440. Thus, the attribute volume may provide a much larger depth of investigation for fractures than the well logs from Block 400 or the dipmeter data from Block 410. In some embodiments, the attribute volume is a chaos volume.

Figure 8:
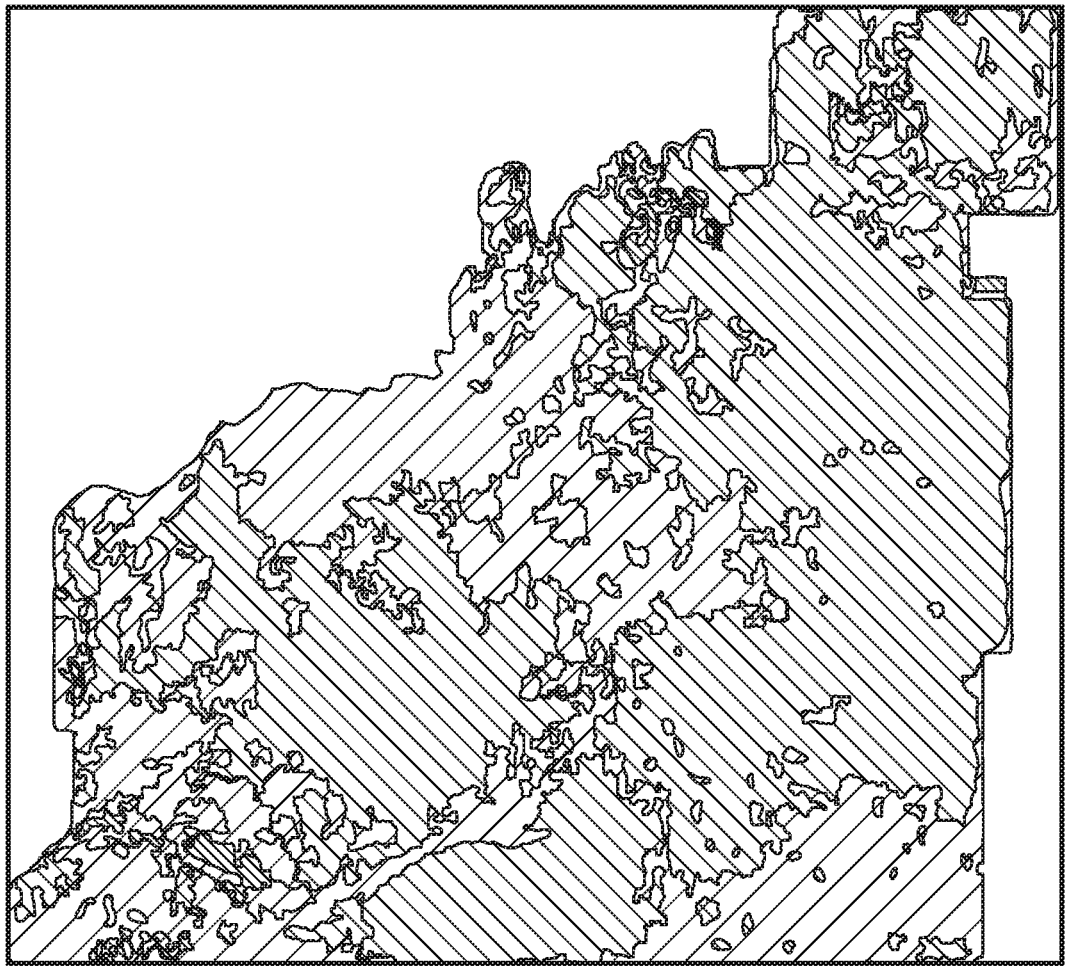
Figure 8:
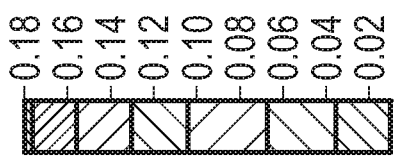

In Block 460, an attribute map including one or more microscale fractures is generated along an interval of interest using an attribute volume in accordance with one or more embodiments. For example, a portion of an attribute volume may be obtained for an interval of interest. The interval of interest may be proximate to a microscale fracture identified next to a wellbore that is used to acquire one or more well logs, such as the well logs in Block 400. In other embodiments, the interval of interest may be a distance away from any wellbore, e.g., where a reservoir region is being analyzed for a new well location. Moreover, the attribute map may be a chaos attribute map based on a chaos attribute. FIG. 8 provides an example of an attribute map in accordance with one or more embodiments. In FIG. 8, a chaos attribute is interpreted as fracture distribution map. The chaotic area represents microscale fractures and the non-chaotic area represents non-fracture area. The fracture regions within the fracture distribution map may be identified for drilling in a potential hydrocarbon reservoir.

In some embodiments, a fracture image including one or more microscale fractures is generated using the attribute map. For example, chaos attribute data may be reprocessed to produce depth data or a migrated seismic image illustrating the one or more microscale fractures. Accordingly, the fracture image may provide the location within a formation of various sub-seismic fractures. This fracture image may be further analyzed or used in various hydrocarbon exploration applications, such as geosteering.

In some embodiments, an attribute map is validated using various seismic data segments or attribute volume segments. To validate the chaos attribute map, for example, various segments of seismic volume sections at different locations may be extracted for analysis. The segments with the chaotic reflections may be located in known discontinuous and chaotic areas while segments with known continuous reflections may be located in the low chaos areas. If the attribute map provides a poor correlation to a microscale fracture, a different seismic attribute may be determined or the previous seismic attribute may be updated.

In Block 470, a wellbore path through one or more microscale fractures is determined using an attribute map in accordance with one or more embodiments. For a hydrocarbon reservoir underground, there are two kinds of oil preservative space. One preservative space may be pore space between mineral grains, while the other preservative space includes fractures within rocks. Therefore, after other exploration elements like source rock, migration path, etc. are assessed in a possible hydrocarbon reservoir, a wellbore path may be drilled within a microscale fracture area.

Furthermore, an attribute map may identify one or more sub-seismic fractures outside the investigation depth threshold of logging tools or coring tools. With a chaos attribute map, areas of the chaos attribute map with relatively higher chaos may highlight microscale fractures, while non-chaotic areas may represent less-developed sub-seismic fractures. Thus, in some embodiments, a fracture distribution is obtained for a geological region of interest using the process described above in FIG. 4 and the accompanying description. The fracture distribution may be used to adjust a wellbore path for geosteering operations, for example. Likewise, the attribute map may also be used to determine various potential reservoirs of hydrocarbons, as well as potential well locations for drilling one or more new wells. Furthermore, fractures regions may be identified for drilling new well locations. As such, predicted sub-seismic fractures may be input into various fracture-analysis tools or techniques to guide reservoir location and development.

Figure 6:
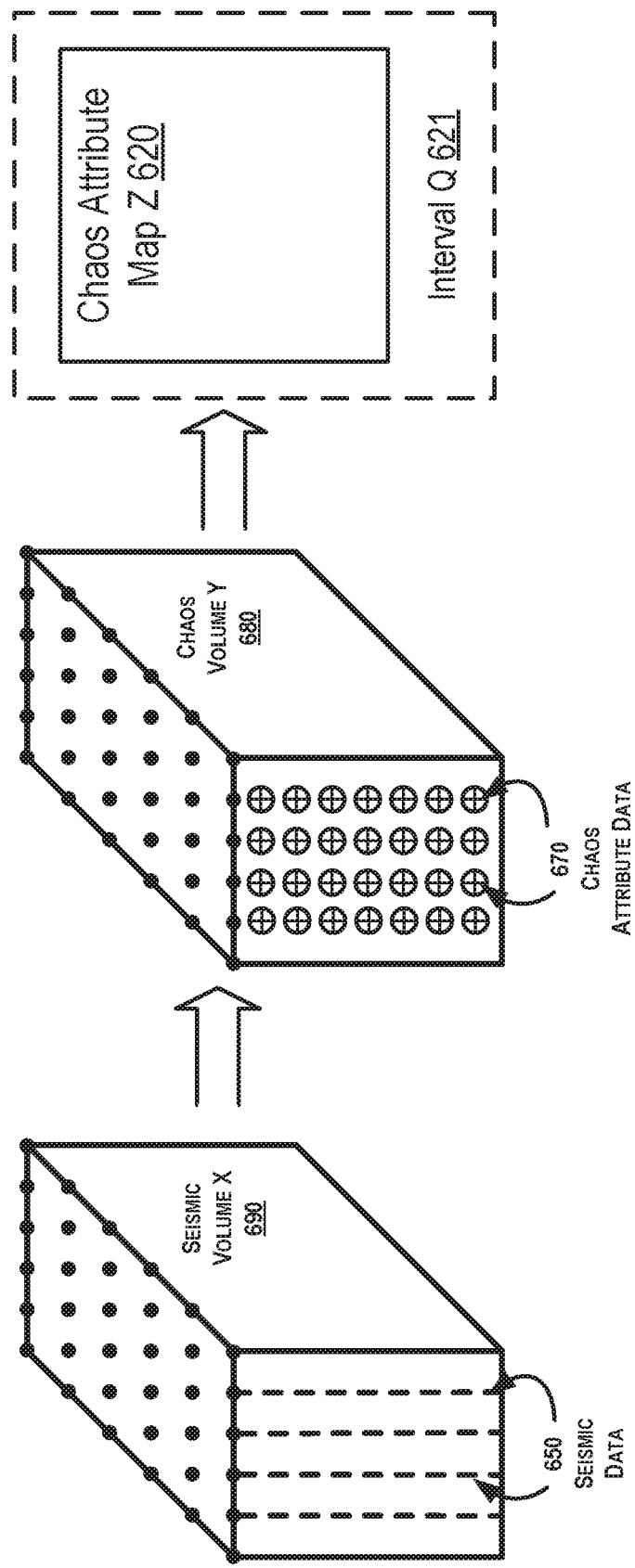

Turning to FIG. 6, FIG. 6 provides an example of generating a chaos attribute map for use in fracture detection. The following example is for explanatory purposes only and not intended to limit the scope of the disclosed technology. In FIG. 6, a seismic volume X (690) is obtained for a geological region, where the seismic volume X (690) includes corresponding seismic data (e.g., seismic data (650)). Using well logs, a particular chaos attribute is determined that corresponds to various sub-seismic fractures within the geological region. This determined chaos attribute is then used to generate a chaos volume Y (680) from the seismic volume X (690) in order to highlight various chaos intensities within the seismic data. Thus, the chaos volume Y (680) includes chaos attribute data (670) based on the determined chaos attribute. Furthermore, an interval Q (621) is selected for analysis, e.g., by a geosteering control system or a reservoir simulator. For example, the interval Q (621) may be adjacent to a reservoir region with a hydrocarbon-bearing formation, where a wellbore path is designed that follows one or more sub-seismic fractures to the hydrocarbon-bearing formation. Accordingly, a chaos attribute map Z (620) may be determined based on the interval Q (621) for use in generating a wellbore path for a drilling system.

In some embodiments, an attribute map is used to determine a stimulation plan. During hydraulic fracturing, for example, sub-seismic fractures may be the majority of fractures while macroscale and mesoscale fractures may be uncommon. Thus, sub-seismic fractures may easily fracture and thus be used to optimize a wellbore path to a hydrocarbon-bearing formation. As such, a stimulation plan may include different fluid types, different stage lengths, different pumping rates, and/or different proppant sizes based on the existence and/or absence of one or more sub-seismic fractures.

Figure 9:
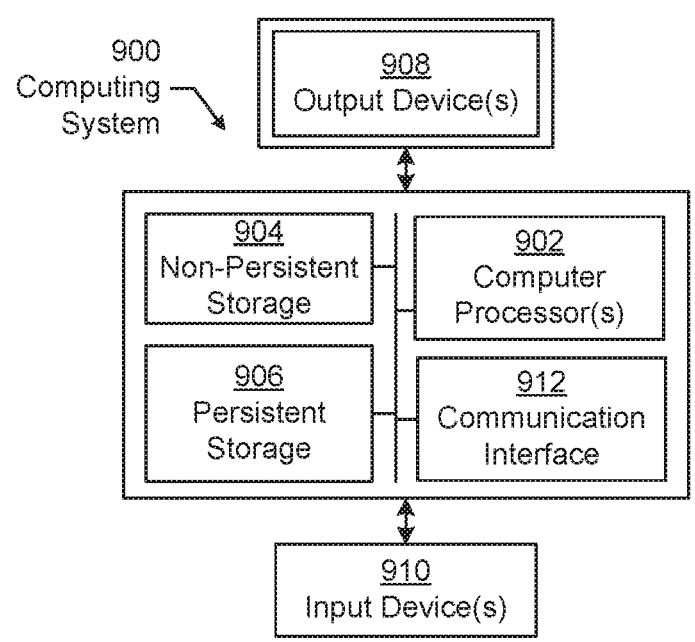
FIG. 9 shows a computing system in accordance with one or more embodiments.

Embodiments may be implemented on a computing system. Any combination of mobile, desktop, server, router, switch, embedded device, or other types of hardware may be used. For example, as shown in FIG. 9, the computing system (900) may include one or more computer processors (902), non-persistent storage (904) (e.g., volatile memory, such as random access memory (RAM), cache memory), persistent storage (906) (e.g., a hard disk, an optical drive such as a compact disk (CD) drive or digital versatile disk (DVD) drive, a flash memory, etc.), a communication interface (912) (e.g., Bluetooth interface, infrared interface, network interface, optical interface, etc.), and numerous other elements and functionalities.

The computer processor(s) (902) may be an integrated circuit for processing instructions. For example, the computer processor(s) may be one or more cores or micro-cores of a processor. The computing system (900) may also include one or more input devices (910), such as a touchscreen, keyboard, mouse, microphone, touchpad, electronic pen, or any other type of input device.

The communication interface (912) may include an integrated circuit for connecting the computing system (900) to a network (not shown) (e.g., a local area network (LAN), a wide area network (WAN) such as the Internet, mobile network, or any other type of network) and/or to another device, such as another computing device.

Further, the computing system (900) may include one or more output devices (908), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (902), non-persistent storage (904), and persistent storage (906). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

The computing system or group of computing systems described in FIG. 9 may include functionality to perform a variety of operations disclosed herein. For example, the computing system(s) may perform communication between processes on the same or different systems. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until the server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, one authorized process may mount the shareable segment, other than the initializing process, at any given time.

Other techniques may be used to share data, such as the various data described in the present application, between processes without departing from the scope of the disclosure. The processes may be part of the same or different application and may execute on the same or different computing system.

Rather than or in addition to sharing data between processes, the computing system performing one or more embodiments of the disclosure may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the disclosure, may extract one or more data items from the obtained data. For example, the extraction may be performed as follows by the computing system (900) in FIG. 9. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail—such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 9, while performing one or more embodiments of the disclosure, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A >B, B may be subtracted from A (i.e., A-B), and the status flags may be read to determine if the result is positive (i.e., if A>B, then A-B >). In one or more embodiments, B may be considered a threshold, and A is deemed to satisfy the threshold if A=B or if A>B, as determined using the ALU. In one or more embodiments of the disclosure, A and B may be vectors, and comparing A with B includes comparing the first element of vector A with the first element of vector B, the second element of vector A with the second element of vector B, etc. In one or more embodiments, if A and B are strings, the binary values of the strings may be compared.

The computing system in FIG. 9 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 9 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 9. Other functions may be performed using one or more embodiments of the disclosure.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

Although the preceding description has been described herein with reference to particular means, materials and embodiments, it is not intended to be limited to the particulars disclosed herein; rather, it extends to all functionally equivalent structures, methods and uses, such as are within the scope of the appended claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A method, comprising:
   obtaining, by a logging system coupled to a drilling system, at least one well log for a first well acquired for a first stratigraphic interval of interest, wherein the at least one well log comprises first dip measurements and first lithologies;
   generating, by a reservoir simulator comprising a computer processor and coupled to the logging system and the drilling system, a first plurality of dip angles for a first stratigraphic structure by comparing the first dip measurements to the first lithologies;
   obtaining, by the reservoir simulator, first seismic data regarding seismic waves acquired for the first stratigraphic interval of interest,
   identifying, by the reservoir simulator, the first stratigraphic structure as a first microscale fracture if:
      a difference between a minimum dip angle of the first plurality of dip angles and a maximum dip angle of the first plurality of dip angles is greater than a predetermined angle threshold, and
      the first stratigraphic structure has a size below a seismic wavelength of the seismic waves; and
   for an identified first microscale fracture:
      determining, by the reservoir simulator, a first seismic attribute that correlates the first microscale fracture to a first subset of the first seismic data,
      generating, by the reservoir simulator, an attribute volume using the first seismic attribute with a seismic volume for a region of interest; and
      generating, by the reservoir simulator and using the attribute volume, a fracture image of the first microscale fracture throughout the region of interest.

2. The method of claim 1,
   wherein the first stratigraphic structure comprises a subsurface reflector, and
   wherein identifying the first stratigraphic structure as the first microscale fracture comprises:
      determining an orientation matrix comprising a plurality of gradients of the subsurface reflector;
      decomposing the orientation matrix in a plurality of eigenvectors with a plurality of eigenvalues;
      determining a plurality of ratios between the plurality of eigenvalues; and
      determining whether the subsurface reflector is a first microscale fracture based on the plurality of ratios.

3. The method of claim 1, further comprising:
   generating a chaos attribute map from the attribute volume; and
   determining a location of the first microscale fracture within the region of interest using the chaos attribute map,
   wherein the location is outside a depth of investigation of a logging tool that generated the at least one well log.

4. The method of claim 3, further comprising:
   validating the chaos attribute map using different seismic sections at different locations within the seismic volume.

5. The method of claim 1,
   wherein the at least one well log comprises a dipmeter plot, and
   wherein identifying the first stratigraphic structure as the first microscale fracture comprises determining whether the dipmeter plot has a plane above a predetermined angle threshold.

6. The method of claim 1, further comprising:
   determining a stimulation plan for the first microscale fracture using the fracture image,
   wherein the stimulation plan produces a flow of hydrocarbons between a reservoir region of interest to a wellbore through the first microscale fracture.

7. The method of claim 1, further comprising:
determining a portion of a second microscale fracture using at least one core sample acquired in a second stratigraphic interval of interest,
wherein a second seismic attribute is determined that correlates the second microscale fracture to a subset of second seismic data.

8. A system, comprising:
a logging system coupled to a plurality of logging tools, wherein the plurality of logging tools comprises a dipmeter logging tool;
a drilling system coupled to the logging system; and
a reservoir simulator comprising a computer processor, wherein the reservoir simulator is coupled to the logging system and the drilling system, the reservoir simulator comprising functionality for:
  obtaining, using the logging system, at least one well log from a first well acquired for a first stratigraphic interval of interest, wherein the at least one well log comprises first dip measurements and first lithologies,
  generating a first plurality of dip angles for a first stratigraphic structure in a subterranean formation by comparing the first dip measurements to the first lithologies,
  obtaining first seismic data regarding seismic waves acquired for the first stratigraphic interval of interest,
  identifying the first stratigraphic structure as a first microscale fracture if:
    a difference between a minimum dip angle of the first plurality of dip angles and a maximum dip angle of the first plurality of dip angles is greater than a predetermined angle threshold; and
    the first stratigraphic structure has a size below a seismic wavelength of the seismic waves, and
  for an identified first microscale fracture:
    determining a first seismic attribute that correlates the first microscale fracture to a first subset of the first seismic data;
    generating an attribute volume using the first seismic attribute with a seismic volume for a region of interest;
    determining, using the attribute volume, a location of the first microscale fracture throughout the region of interest; and
    determining, using the location of the first microscale fracture, a wellbore path through the subterranean formation.

9. The system of claim 8, wherein the reservoir simulator further comprises functionality for:
generating a chaos attribute map from the attribute volume; and
determining a location of the first microscale fracture within the region of interest using the chaos attribute map, wherein the location is outside a depth of investigation of a logging tool that generated the at least one well log.

10. The system of claim 8,
wherein the at least one well log comprises a dipmeter plot, and
wherein the first stratigraphic structure is identified as a first microscale fracture based on the dipmeter plot having a plane above a predetermined angle threshold.

11. The system of claim 8, further comprising:
determining a stimulation plan for the first microscale fracture using a fracture image of the first microscale fracture,
wherein the stimulation plan produces a flow of hydrocarbons between a reservoir region of interest to a wellbore through the first microscale fracture.

12. The system of claim 8, further comprising:
determining a portion of a second microscale fracture using at least one core sample acquired in a second stratigraphic interval of interest,
wherein a second seismic attribute is determined that correlates the second microscale fracture to a subset of second seismic data.

13. A non-transitory computer readable medium storing instructions executable by a computer processor, the instructions comprising functionality for:
obtaining at least one well log acquired for a stratigraphic interval of interest,
  wherein the at least one well log is acquired by a logging system coupled to a drilling system, and
  wherein the at least one well log comprises dip measurements and lithologies;
generating a plurality of dip angles for a stratigraphic structure by comparing the dip measurements to the lithologies;
obtaining seismic data regarding seismic waves acquired in a region of interest comprising the stratigraphic interval of interest;
identifying the stratigraphic structure as a first microscale fracture if:
  a difference between a minimum dip angle of the plurality of dip angles and a maximum dip angle of the plurality of dip angles is greater than a predetermined angle threshold, and
  the stratigraphic structure has a size below a seismic wavelength of the seismic waves; and
for an identified first microscale fracture:
  determining a seismic attribute that correlates the first microscale fracture to a subset of the seismic data,
  generating an attribute volume using the seismic attribute with a seismic volume for a region of interest, and
  generate, using the attribute volume, a fracture image of the first microscale fracture throughout the region of interest.

14. The non-transitory computer readable medium of claim 13, wherein the instructions further comprise functionality for:
determining an orientation matrix comprising a plurality of gradients of a subsurface reflector;
decomposing the orientation matrix in a plurality of eigenvalues;
determining a plurality of ratios between the plurality of eigenvalues; and
determining whether the subsurface reflector is a first microscale fracture based on the plurality of ratios.

15. The non-transitory computer readable medium of claim 13, wherein the instructions further comprise functionality for:
generating a chaos attribute map from the attribute volume; and
determining a location of the first microscale fracture within the region of interest using the chaos attribute map,
wherein the location is outside a depth of investigation of a logging tool that generated the at least one well log.

16. The method of claim 1, further comprising:
obtaining, by the reservoir simulator, a second well log for a second well traversing the first stratigraphic interval of interest, wherein the second well log comprises second dip measurements and second lithologies;

generating, by the reservoir simulator, a second plurality of dip angles for a second stratigraphic structure by comparing the second dip measurements to the second lithologies; and identifying, by the reservoir simulator, the second stratigraphic structure as a non-microscale structure if:
a difference between a minimum dip angle of the second plurality of dip angles and a maximum dip angle of the second plurality of dip angles is less than or equal to the predetermined angle threshold;

wherein, for an identified non-microscale structure, the first seismic attribute correlates:
the first microscale fracture to a first subset of the first seismic data, and
the non-microscale structure to a second subset of the first seismic data.

17. The system of claim 8, wherein the reservoir simulator further comprises functionality for:

obtaining a second well log for a second well acquired for the first stratigraphic interval of interest, wherein the second well log comprises second dip measurements and second lithologies;

generating a second plurality of dip angles for a second stratigraphic structure by comparing the second dip measurements to the second lithologies; and identifying the second stratigraphic structure as a non-microscale structure if:
a difference between a minimum dip angle of the second plurality of dip angles and a maximum dip angle of the second plurality of dip angles is less than or equal to the predetermined angle threshold;

wherein, for an identified non-microscale structure, the first seismic attribute correlates:
the first microscale fracture to a first subset of the first seismic data, and
the non-microscale structure to a second subset of the first seismic data.

* * * * *